(12) United States Patent
Brenneman et al.

(10) Patent No.: US 8,220,032 B2
(45) Date of Patent: Jul. 10, 2012

(54) METHODS, DEVICES, AND COMPUTER PROGRAM PRODUCTS FOR DISCOVERING AUTHENTICATION SERVERS AND ESTABLISHING TRUST RELATIONSHIPS THEREWITH

(75) Inventors: Robert J. Brenneman, Stormville, NY (US); Michael E. Browne, Staatsburg, NY (US); William J. Huie, Poughkeepsie, NY (US); Sarah J. Sheppard, Poughkeepsie, NY (US); Kyle M. Smith, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 12/021,559

(22) Filed: Jan. 29, 2008

(65) Prior Publication Data

US 2009/0193508 A1 Jul. 30, 2009

(51) Int. Cl.
*H04L 29/06* (2006.01)

(52) U.S. Cl. ............. 726/3; 726/2; 726/4; 726/5; 726/9; 726/26; 726/27; 726/29; 705/64; 705/65; 709/223; 709/225

(58) Field of Classification Search .................. 726/2, 3, 726/4, 5, 9, 26, 27, 29; 705/64, 65; 709/223, 709/225
See application file for complete search history.

(56) References Cited

U.S. PATENT DOCUMENTS

| 5,544,322 | A | | 8/1996 | Cheng et al. | |
| 5,948,064 | A | | 9/1999 | Bertram et al. | |
| 6,418,466 | B1 | | 7/2002 | Bertram et al. | |
| 7,254,387 | B2 | * | 8/2007 | Dunlop et al. | 455/418 |
| 7,467,203 | B2 | * | 12/2008 | Kang et al. | 709/224 |
| 7,712,129 | B2 | * | 5/2010 | Takehi | 726/6 |
| 8,069,435 | B1 | * | 11/2011 | Lai | 717/106 |
| 2003/0023880 | A1 | | 1/2003 | Edwards et al. | |
| 2004/0088543 | A1 | * | 5/2004 | Garg et al. | 713/157 |
| 2004/0128392 | A1 | * | 7/2004 | Blakley et al. | 709/229 |
| 2004/0230831 | A1 | | 11/2004 | Spelman et al. | |
| 2004/0243848 | A1 | * | 12/2004 | Blackburn et al. | 713/201 |
| 2005/0108575 | A1 | | 5/2005 | Yung | |
| 2005/0114701 | A1 | * | 5/2005 | Atkins et al. | 713/201 |
| 2005/0120246 | A1 | * | 6/2005 | Jang et al. | 713/201 |
| 2005/0223217 | A1 | * | 10/2005 | Howard et al. | 713/155 |
| 2006/0129817 | A1 | * | 6/2006 | Borneman et al. | 713/170 |
| 2006/0184646 | A1 | * | 8/2006 | Schmidt et al. | 709/218 |
| 2006/0200670 | A1 | | 9/2006 | Kuffel et al. | |
| 2007/0094400 | A1 | * | 4/2007 | Childress et al. | 709/229 |
| 2007/0234417 | A1 | * | 10/2007 | Blakley, III et al. | 726/12 |

(Continued)

*Primary Examiner* — Nathan Flynn
*Assistant Examiner* — Sarah Su
(74) *Attorney, Agent, or Firm* — Cantor Colburn LLP; Steven Chiu

(57) ABSTRACT

Using an authentication server to discover one or more additional authentication servers and to dynamically establish a trust relationship with the one or more additional authentication servers. The authentication server searches for the one or more additional authentication servers to discover one or more sources of authentication tokens, and inspects an incoming authentication request from the one or more additional authentication servers to determine if the request is carrying one or more authentication tokens from a newly discovered realm. Once the authentication server determines a newly discovered realm to be trustworthy, the authentication server receives a directory schema from the newly discovered realm and compares the received directory schema with a known directory schema retrieved by the authentication server to identify an intersection of the received directory schema and the known directory schema. The authentication server uses the intersection to identify a primary key, and to identify any unique information that is specific to either the authentication server or the newly discovered realm.

18 Claims, 6 Drawing Sheets

U.S. PATENT DOCUMENTS

| | | | |
|---|---|---|---|
| 2008/0022090 A1* | 1/2008 | Kishimoto | 713/156 |
| 2008/0072301 A1* | 3/2008 | Chia et al. | 726/8 |
| 2008/0086762 A1* | 4/2008 | Kaneko et al. | 726/4 |
| 2008/0263645 A1* | 10/2008 | Renter et al. | 726/6 |
| 2009/0037736 A1* | 2/2009 | Djordjrvic et al. | 713/170 |
| 2009/0320114 A1* | 12/2009 | Guo et al. | 726/8 |

* cited by examiner

METHODS, DEVICES, AND COMPUTER PROGRAM PRODUCTS FOR DISCOVERING AUTHENTICATION SERVERS AND ESTABLISHING TRUST RELATIONSHIPS THEREWITH

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to authentication servers and, more particularly, to discovering authentication servers and establishing trust relationships therewith.

2. Description of Background

Federated identity allows a user of a computing device to log on to a given website or server, have their identity authenticated, and then permit that website or server to vouch for their identity while they try to gain access to other websites, servers, or networks. For example, employees who need to look up information regarding heath care benefits typically have to access a third-party website by entering a log-on name and a password specific to that third-party website. However, federated identity enables these employees to automatically link to the third-party website without the necessity of logging onto the site via a site-specific log-on name and password. One illustrative example of federated security software is Tivoli Federated Identity Manager (TFIM). TFIM is compatible with several federated identity standards and specifications, including Liberty, Security Assertion Markup Language (SAML), Web Services Federation (WS-Federation), WS-Security and WS-Trust. TFIM uses a federated identity manager that allows users to sign on for internal and external services throughout a company and to contact any of the company's partners authorized to use TFIM.

In order to implement federated identity procedures, existing authentication systems must be explicitly federated together using federated security software such as TFIM. However, when existing federated security software packages are utilized, intra-domain relationships between previously separate authentication registries must be statically defined by an administrator, even in the context of TFIM. Statically defining these relationships requires significant administrative overhead for aligning policies from different domains and does not facilitate dynamic security mechanisms. A need therefore exists for improved methods by which federated identity procedures may be implemented. A solution that addresses, at least in part, the above and other shortcomings is desired.

SUMMARY OF THE INVENTION

Embodiments of the invention include methods for using an authentication server to discover one or more additional authentication servers and to dynamically establish a trust relationship with the one or more additional authentication servers. The methods include the authentication server searching for the one or more additional authentication servers to discover one or more sources of authentication tokens, and inspecting an incoming authentication request from the one or more additional authentication servers to determine if the request is carrying one or more authentication tokens from a newly discovered realm. If the request is carrying one or more authentication tokens from the newly discovered realm, then the authentication server determines whether or not the newly discovered realm is trustworthy by initiating communications with at least one trusted authentication server to ascertain whether or not there is an existing trust relationship between the at least one trusted authentication server and the newly discovered realm. If there is an existing trust relationship between the at least one trusted authentication server and the newly discovered realm, then the authentication server determines that the newly discovered realm is trustworthy. If there is not an existing trust relationship between the at least one trusted authentication server and the newly discovered realm, then the authentication server determines that the newly discovered realm is not yet trustworthy, and one or more attempts are made to use a plurality of additional authentication tokens to validate information provided by the newly discovered realm before accepting any authentications from the newly discovered realm. The authentication server determines that the not yet trustworthy newly discovered realm is trustworthy after a plurality of correct authentication tokens are received from the newly discovered realm. Once the authentication server determines a newly discovered realm to be trustworthy, the authentication server receives a directory schema from the newly discovered realm and compares the received directory schema with a known directory schema retrieved by the authentication server to identify an intersection of the received directory schema and the known directory schema. The authentication server uses the intersection to identify a primary key, and to identify any unique information that is specific to either the authentication server or the newly discovered realm.

Devices and computer program products corresponding to the above-summarized methods are also described and claimed herein. Other methods, devices, and computer program products according to embodiments will be or become apparent to one with skill in the art upon review of the following drawings and detailed description. It is intended that all such additional methods and computer program products be included within this description, be within the scope of the present invention, and be protected by the accompanying claims.

BRIEF DESCRIPTION OF THE DRAWINGS

Referring now to the drawings, wherein like elements are numbered alike in the several FIGURES.

The detailed description explains the preferred embodiments of the invention, together with advantages and features, by way of example with reference to the drawings.

DETAILED DESCRIPTION OF THE INVENTION

In the following description, details are set forth to provide an understanding of the invention. In some instances, certain software, circuits, structures and methods have not been described or shown in detail in order not to obscure the invention. The term "data processing system" is used herein to refer to any machine for processing data, including the client/server computer systems and network arrangements described herein. The present invention may be implemented in any computer programming language provided that the operating system of the data processing system provides the facilities that may support the requirements of the present invention. The invention may be implemented with software, firmware, or hardware, or any of various combinations thereof.

Figure 1:
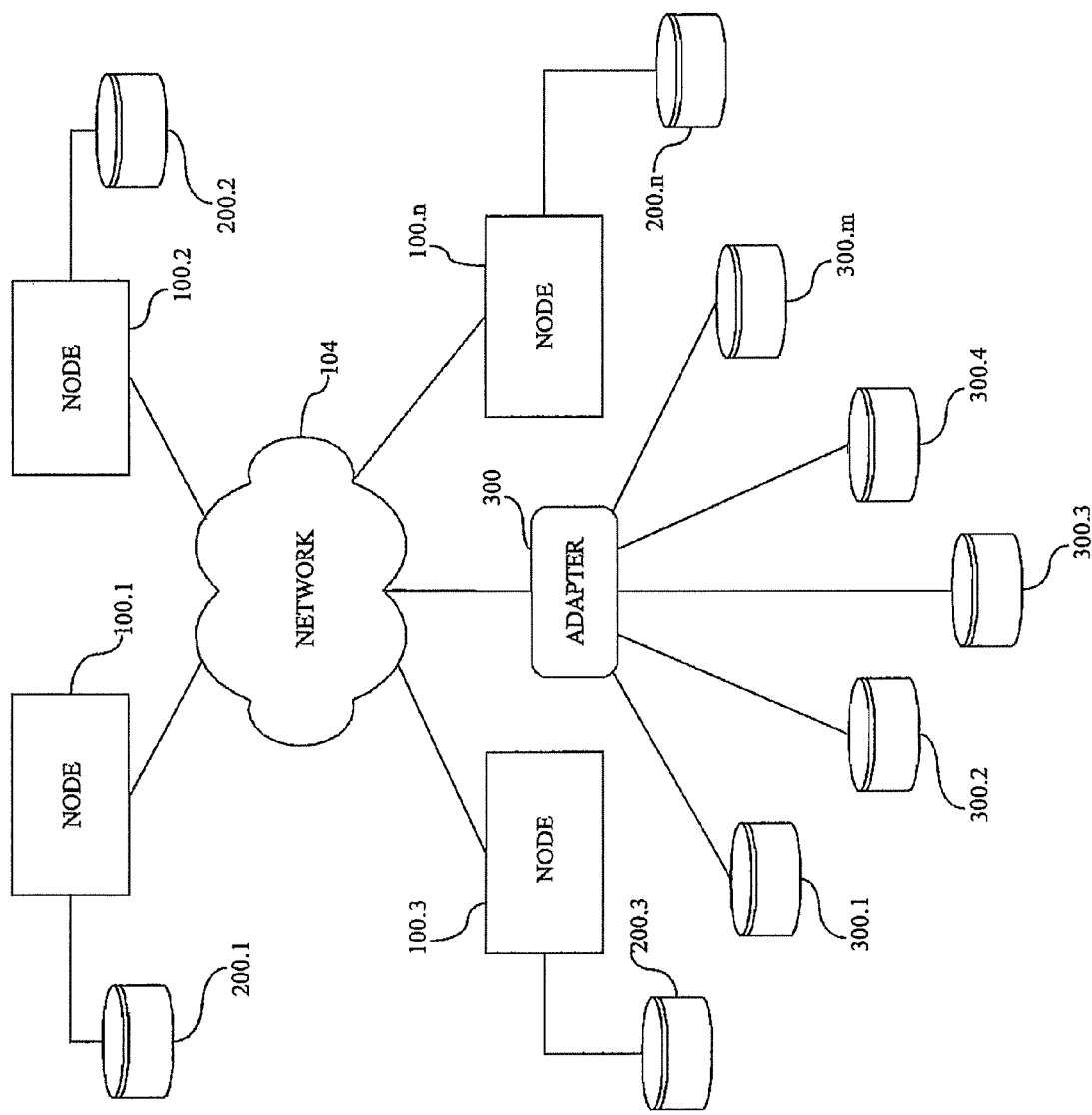
FIG. 1 is an architectural block diagram showing an illustrative operational environment for the present invention.

FIG. 1 is an architectural block diagram showing an illustrative operational environment for the present invention.

Figure 2A:
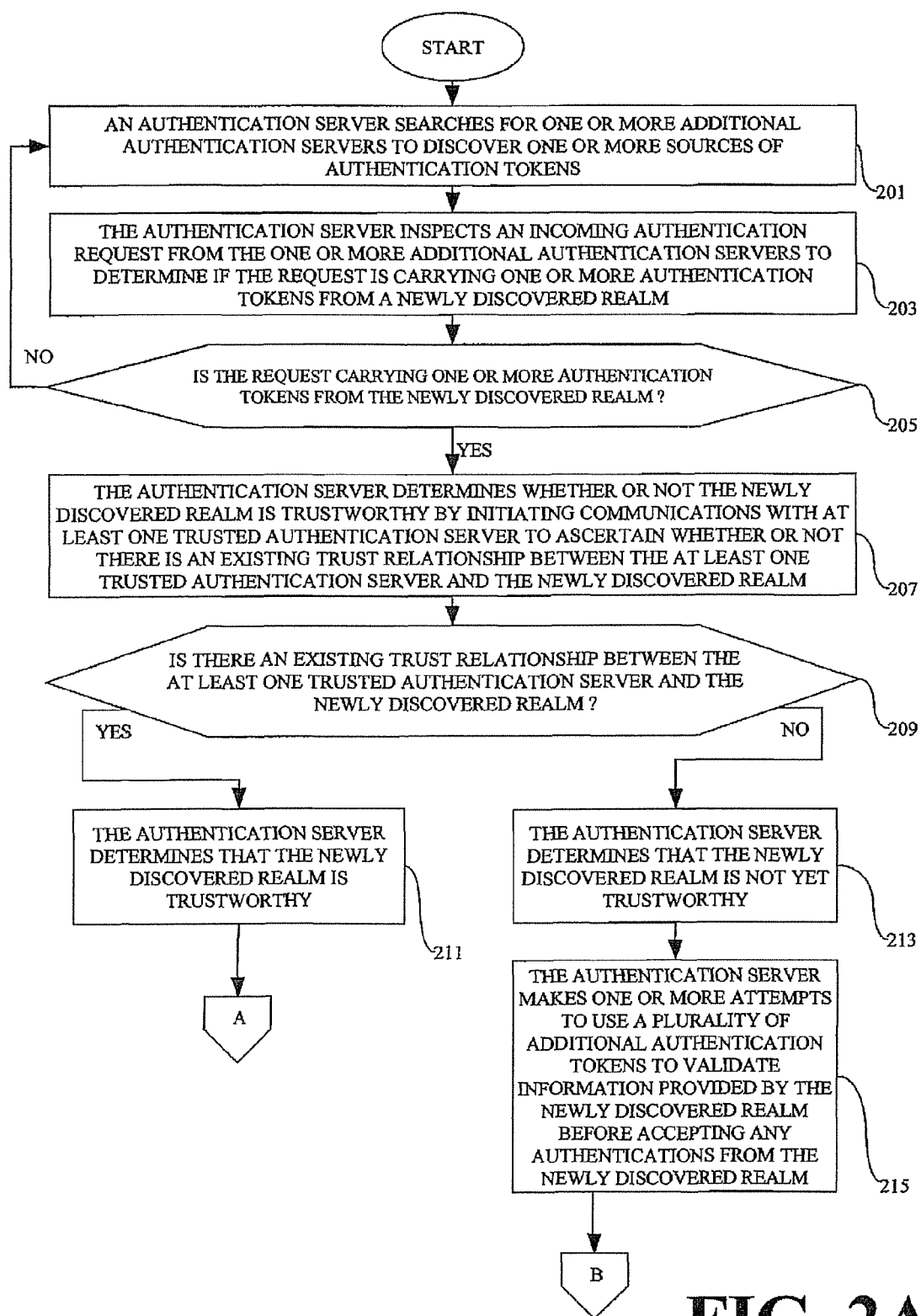
FIGS. 2A and 2B together comprise a flowchart setting forth a first exemplary method for discovering authentication servers and establishing trust relationships therewith.
Figure 2B:
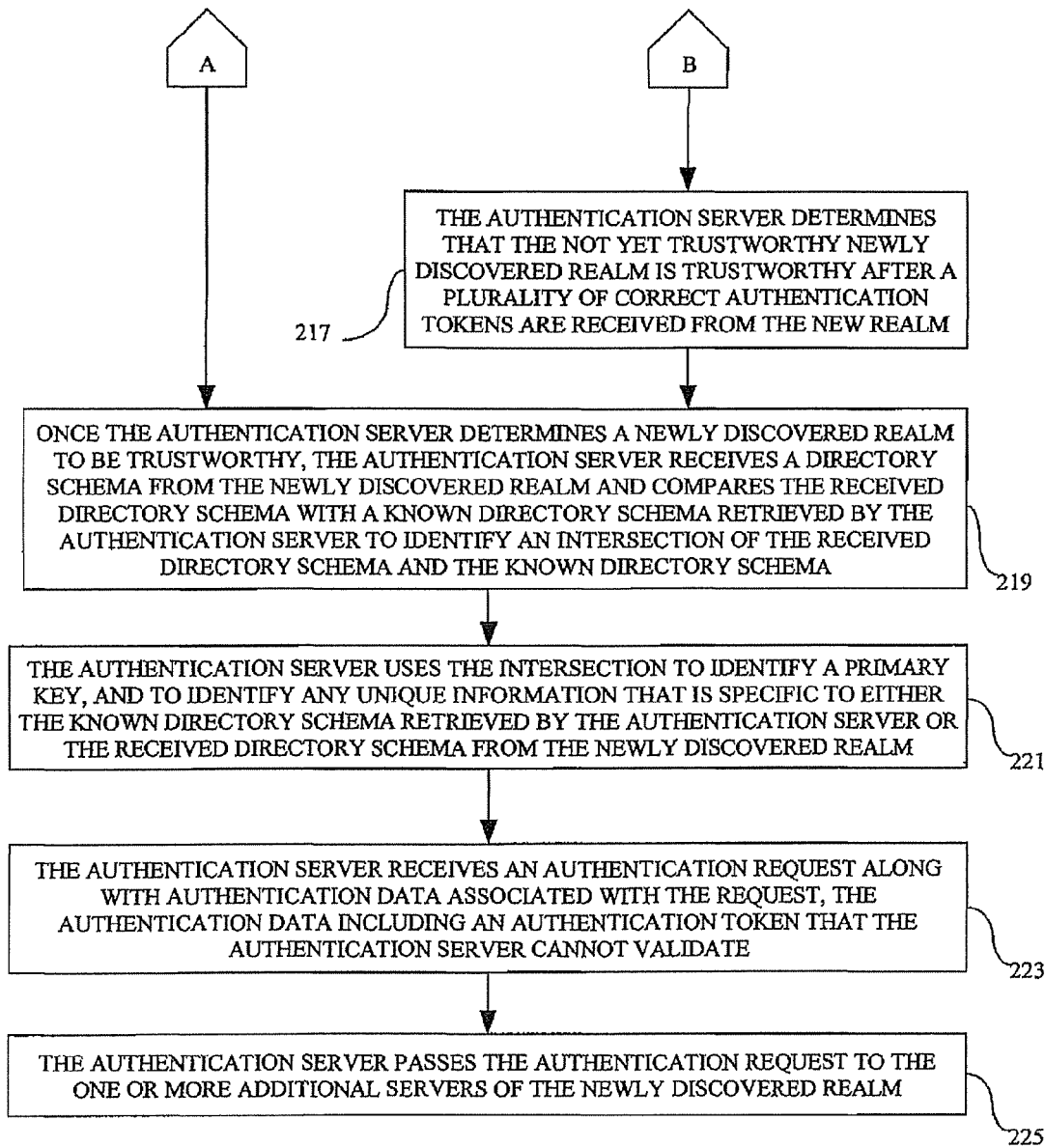

FIGS. 2A and 2B together comprise a flowchart setting forth a first exemplary method for discovering authentication servers and establishing trust relationships therewith.

Figure 3:
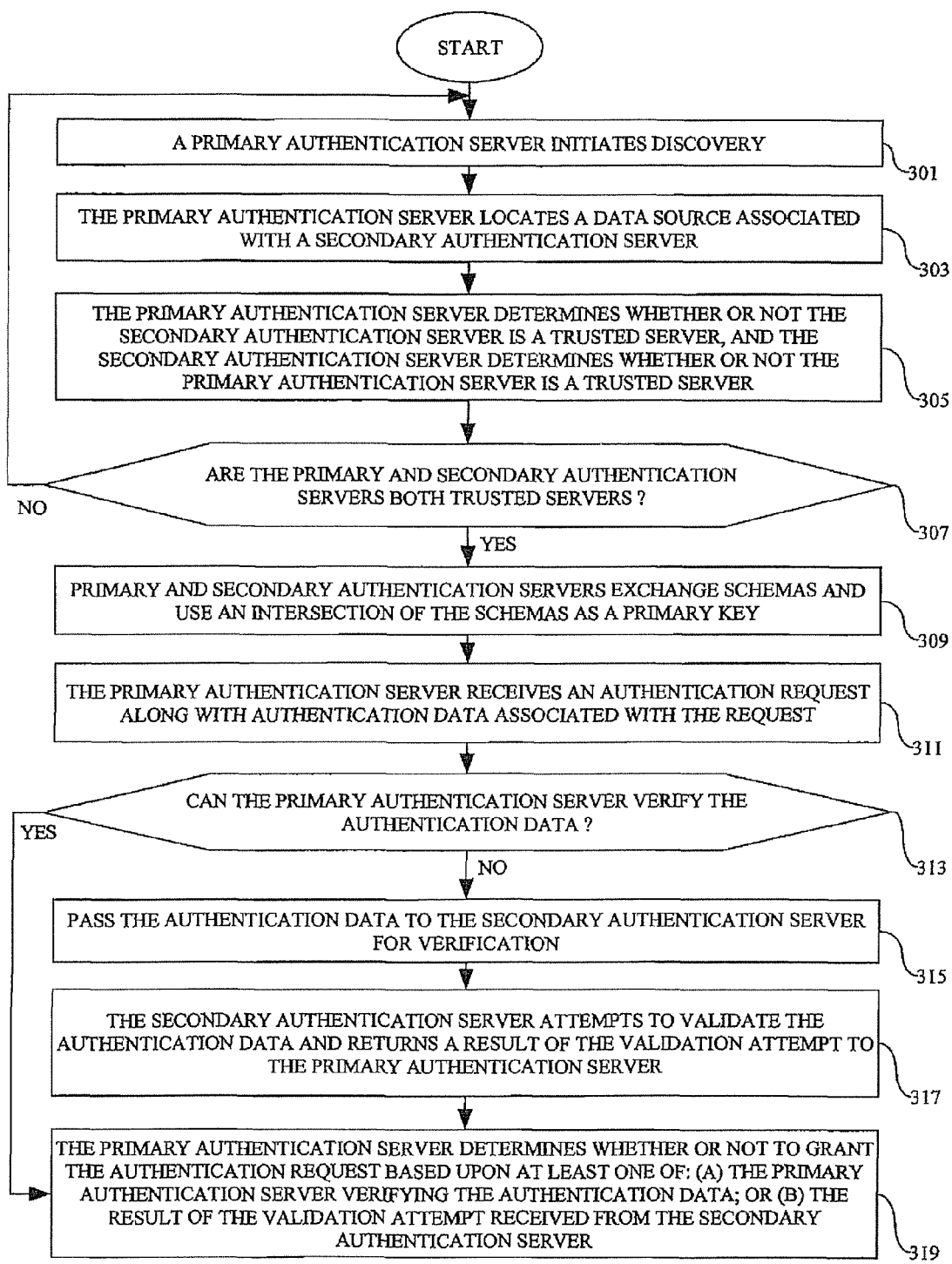
FIG. 3 is a flowchart setting forth a second exemplary method for discovering authentication servers and establishing trust relationships therewith.

FIG. 3 is a flowchart setting forth a second exemplary method for discovering authentication servers and establishing trust relationships therewith.

Figure 4:
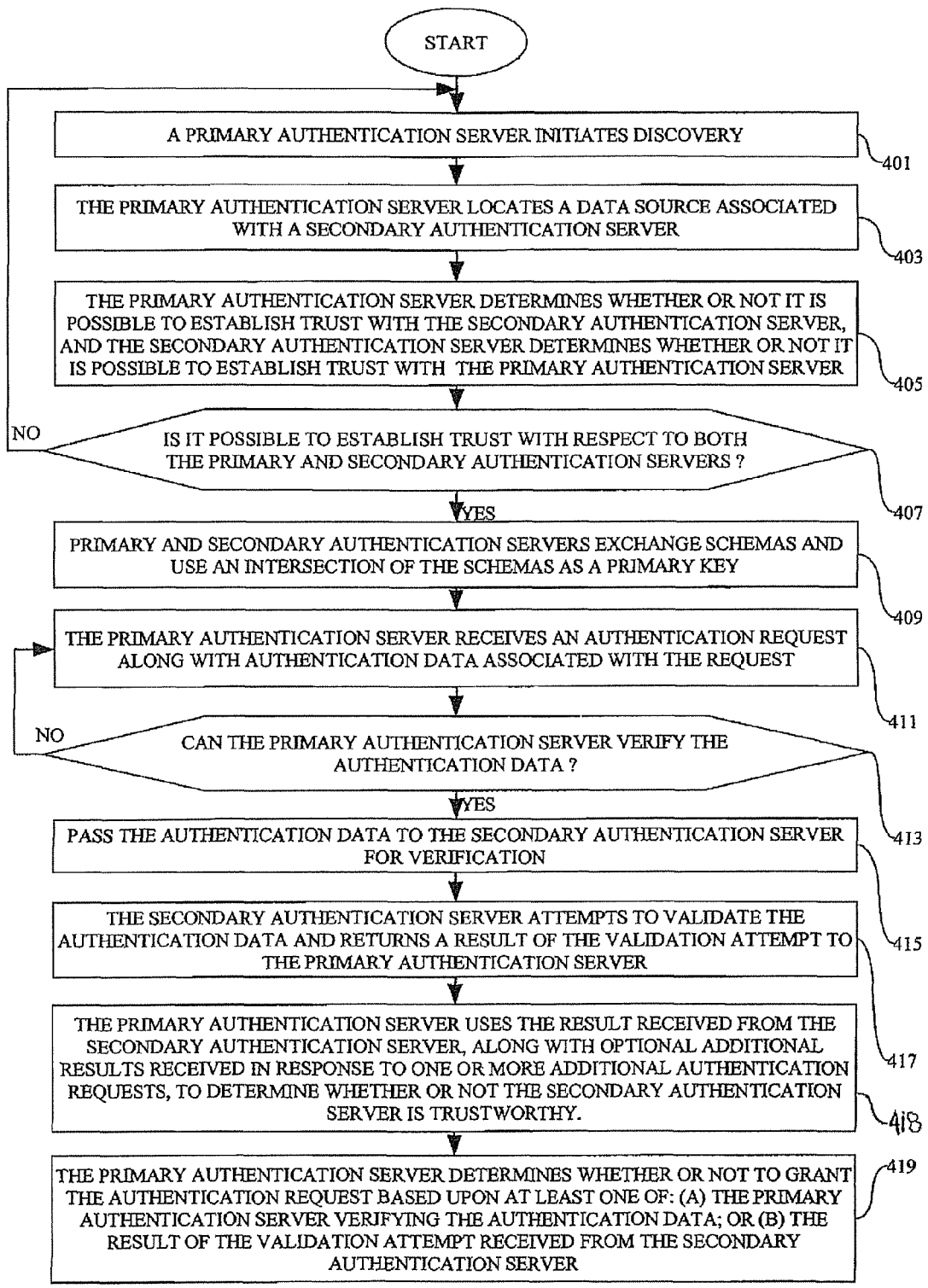
FIG. 4 is a flowchart setting forth a third exemplary method for discovering authentication servers and establishing trust relationships therewith.

FIG. 4 is a flowchart setting forth a third exemplary method for discovering authentication servers and establishing trust relationships therewith.

Figure 5:
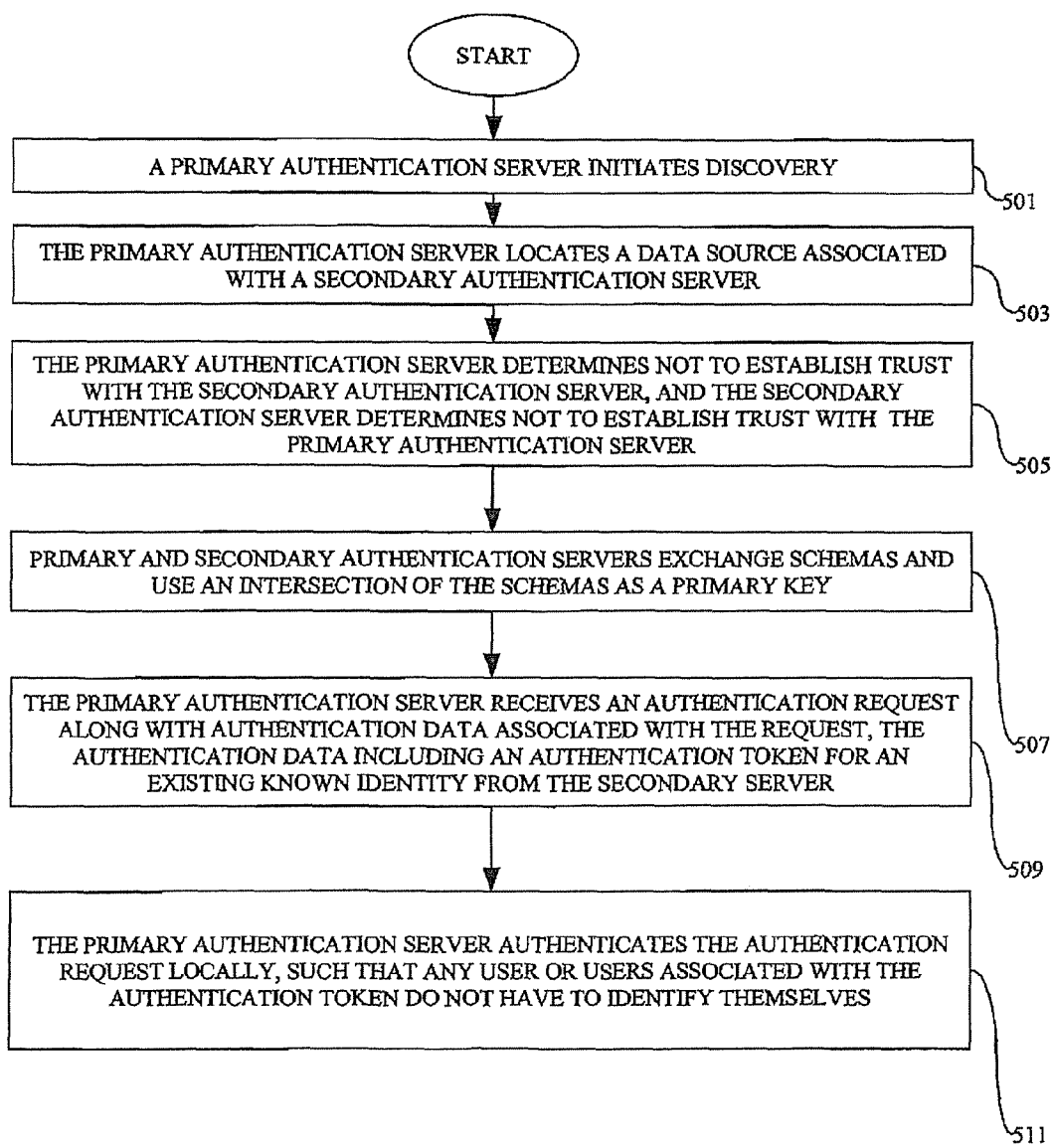
FIG. 5 is a flowchart setting forth a fourth exemplary method for discovering authentication servers and establishing trust relationships therewith.

FIG. 5 is a flowchart setting forth a fourth exemplary method for discovering authentication servers and establishing trust relationships therewith.

FIG. 1 is a block diagram setting forth an illustrative operational environment in which the present invention is employed. In particular, a plurality of authentication servers in the form of nodes 100.1 through 100.n are interconnected over a network 104. Nodes 100.1 through 100.n perform data input/output (I/O) operations on a storage device through a server node or over a local path. Nodes 100.1 through 100.n are operably coupled to network 104 through one or more adapters, cables, switches, or any of various combinations thereof.

In preferred embodiments of the present invention, each node 100.i represents an authentication server in the form of a processor node capable of communicating with other processor nodes using the publicly defined Transmission Control Protocol/Internet Protocol (TCP/IP) messaging protocol. While this protocol is referred to as an Internet Protocol, it should be noted that use of this term herein does not imply the existence of any Internet connection, nor does it imply dependence upon the Internet in any way. It is simply the name of a conveniently used, well characterized communication protocol suitable for use within a connected network of data processing nodes.

Each node 100.i may include one or more Central Processing Units (CPUs), some or all of which share memory with one another. This memory can be implemented using any computer readable storage medium such as electronic memory, magnetic memory, optical memory, or any of various combinations thereof. One or more of these CPUs are capable of implementing an operating system. Each node 100.i may be connected locally to a non-volatile storage device such as a Direct Access Storage Device (DASD) unit or other similar storage device 200.i, where i is an integer greater than or equal to 2, but less than or equal to n. Storage device 200.i typically comprises a rotating magnetic disk storage unit, sometimes referred to as a disk drive. However, the scope of the present invention includes any nonvolatile storage mechanism capable of holding data files. The number n of nodes 100.i is not critical. Furthermore, not everything operably coupled to network 400 has to be a data processing node. A plurality of DASD storage devices 300.1 through 300.m are connected to network 400 using, for example, a network adapter 300 for maintaining communication between DASD storage devices 300.1 to 300.m and network 400.

The nodes 100.i may contain additional software and hardware, a description of which is not necessary for understanding the invention. One or more of the nodes 100.i has stored therein data representing sequences of instructions which, when executed, cause the methods described hereinafter to be performed. Thus, one or more of the nodes 100.i include computer executable programmed instructions for directing the system of FIG. 1 to implement any of the embodiments of the present invention.

The programmed instructions may be embodied in at least one hardware, firmware, or software module resident in a memory associated with the one or more Central Processing Units (CPUs) of one or more nodes 100.i. This memory can be implemented using any computer readable storage medium such as electronic memory, magnetic memory, optical memory, or any of various combinations thereof. Alternatively or additionally, the programmed instructions may be embodied on a computer readable medium (such as a CD disk or floppy disk) which may be used for transporting the programmed instructions to the memory of the node 100.i. Alternatively or additionally, the programmed instructions may be embedded in a computer-readable, signal or signal-bearing medium that is uploaded to the node 100.i by a vendor or supplier of the programmed instructions, and this signal or signal-bearing medium may be downloaded through an interface to the node 100.i from the network 400 by end users or potential buyers.

FIGS. 2A and 2B together comprise a flowchart setting forth a first exemplary method for discovering authentication servers and establishing trust relationships therewith. More specifically, the method includes using an authentication server to discover one or more additional authentication servers and to dynamically establish a trust relationship with the one or more additional authentication servers. The procedure of FIGS. 2A and 2B commences at block 201 (FIG. 2A) where the authentication server searches for the one or more additional authentication servers to discover one or more sources of authentication tokens. Next, at block 203, the authentication server inspects an incoming authentication request from the one or more additional authentication servers in order to determine if the request is carrying one or more authentication tokens from a newly discovered realm. At block 205, a test is performed to ascertain whether or not the request is carrying one or more authentication tokens from the newly discovered realm. The negative branch from block 205 loops back to block 201.

If the request is carrying one or more authentication tokens from the new realm as determined at block 205, then the authentication server determines whether or not the new realm is trustworthy by initiating communications with at least one trusted authentication server to ascertain whether or not there is an existing trust relationship between the at least one trusted authentication server and the new realm (block 207). This is similar to trusting a Pretty Good Privacy (PGP) key because it is signed with a trusted third party key. Further information regarding use of PGP keys is described in chapter 1 of a document entitled "Introduction to Cryptography", copyright © 1990-1999 Network Associates, Inc., published on the Internet, and incorporated by reference herein in its entirety.

At block 209, a test is performed to ascertain whether or not there is an existing trust relationship between the at least one trusted authentication server and the newly discovered realm. The affirmative branch from block 209 leads to block 211, and the negative branch from block 209 leads to block 213. At block 211, if there is an existing trust relationship between the at least one trusted authentication server and the newly discovered realm, then the authentication server determines that the newly discovered realm is trustworthy. At block 213, if there is not an existing trust relationship between the at least one trusted authentication server and the newly discovered realm, then the authentication server determines that the newly discovered realm is not yet trustworthy, and at block 215, one or more attempts are made to use a plurality of additional authentication tokens to validate information provided by the newly discovered realm before accepting any authentications from the newly discovered realm. The authentication server determines that the not yet trustworthy newly discovered realm is trustworthy (FIG. 2B, block 217) after a plurality of correct authentication tokens are received from the newly discovered realm.

Block 219 is performed after either of blocks 217 or 211 are performed. At block 219, once the authentication server determines a newly discovered realm to be trustworthy, the authentication server receives a directory schema from the newly discovered realm and compares the received directory schema with a known directory schema retrieved by the authentication server to identify an intersection of the received directory schema and the known directory schema. The authentication server uses the intersection to identify a primary key, and to identify any unique information that is specific to either the authentication server or the newly discovered realm (block 221). Thus, for example, if each of a plurality of newly discovered realms are deemed trustworthy, the authentication server contacts each realm and compares the directory schemas to determine if there are any correlation points or information that is unique ("Do you have some information that I don't that will be useful to me and do we have some common information that could be used as a primary key to establish the user's identity?"). If and when primary keys are identified, the authentication servers can locate the unique information per-user specific to each server. Then, as discussed hereinafter, if there is information unique to a server then when the authentication server receives information from the user that it cannot validate, it can pass the data validation request to an alternate server.

The authentication server receives an authentication request, along with authentication data associated with the request, the authentication data including an authentication token that the authentication server cannot validate (block 223). The authentication server passes the authentication request to the one or more additional servers of the newly discovered realm (block 225).

Optionally, block 201 includes the authentication server actively seeking out other authentication servers via service location protocol (SLP) or another service discovery method. Optionally, block 203 includes the authentication server inspecting incoming authentication requests to determine if the request is carrying authentication tokens from other newly discovered or unknown realms, and then adds those realms to a discovery list.

FIG. 3 is a flowchart setting forth a second exemplary method for discovering authentication servers and establishing trust relationships therewith. The procedure commences at block 301 where the authentication server initiates discovery. At block 303, the authentication server locates a data source associated with a secondary authentication server. The primary and secondary authentication servers decide how much to trust each other (blocks 305 and 307). If trust is established, then the procedure of FIG. 3 continues to block 309 where the primary and secondary authentication servers exchange schemas and use an intersection of the schemas as a primary key (email, for instance). When an authentication request is received at the primary authentication server (blocks 311 and 313), data that cannot be verified by the primary authentication server is passed along to the secondary authentication server for verification (block 315). The secondary authentication server attempts to validate the authentication data and returns a result of the attempt to the primary authentication server (block 317). The actual private data need not be shared, only the result. At block 319, the primary authentication server uses the results obtained in blocks 313 and 317 to make a decision as to whether or not to grant the authentication request.

FIG. 4 is a flowchart setting forth a third exemplary method for discovering authentication servers and establishing trust relationships therewith. At block 401, a primary authentication server initiates discovery. Next, at block 403, the primary authentication server locates a data source associated with a secondary authentication server. The primary and secondary authentication servers decide how much to trust each other (blocks 405 and 407). If trust is not established but possible, then the program advances to block 409 where the primary and secondary authentication servers exchange schemas and use the intersection of the schemas as a primary key (email, for instance).

When an authentication request is received with data that can be verified by the primary authentication server (blocks 411 and 413), it is also queried against the secondary authentication server (blocks 415 and 417) and answers are used by the primary authentication server (block 418) to determine whether the secondary authentication server is trustworthy over time. As trust grows between the primary and secondary authentication servers, the procedure of FIG. 4 may be replaced or supplanted by the procedure of FIG. 3. Next, at block 419 (FIG. 4), the primary authentication server uses the results of blocks 413 and 417 to make a decision as to whether or not to grant the authentication request.

FIG. 5 is a flowchart setting forth a fourth exemplary method for discovering authentication servers and establishing trust relationships therewith. Basically, an authentication server may choose not to trust a newly discovered realm. However, even when not trusting the newly discovered realm, it may be possible to exchange user information such that the identity of a user can be known to both the authentication server and the newly discovered realm, but to not trust the newly discovered realm to authenticate user sessions correctly. This would be halfway to single sign on—a user crossing between realms is known to the newly discovered realm, but the users have to authenticate themselves before obtaining access.

The procedure of FIG. 5 commences at block 501 where the authentication server initiates discovery. Next, at block 503, the server locates a data source associated with a secondary authentication server. At block 505, the primary and secondary authentication servers decide not to trust each other. The primary and secondary authentication servers exchange schemas (block 507) and use the intersection of the schemas as the primary key (email, for instance). An authentication request arrives at the primary authentication sever (block 509), wherein the request contains an authentication token for an existing known identity from the secondary authentication server (i.e., an untrusted server). The primary authentication server authenticates the request locally (block 511), such that a user does not have to identify himself or herself again.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for dynamically establishing a trust relationship between authentication servers, the method comprising:
    initiating by, a first authentication server, searching for one or more additional authentication servers for the purpose of discovering one or more sources of authentication tokens, the searching comprising a processor node of the first authentication server initiating a communication exchange with at least one other processor node of the one or more additional authentication servers, and inspecting an incoming authentication request from the one or more additional authentication servers to determine if the incoming authentication request is carrying one or more authentication tokens from a newly discovered realm, wherein the first authentication server and the one or more additional authentication servers include one or more processing devices;
    responsive to the request carrying one or more authentication tokens from the newly discovered realm, determining, by the first authentication server, whether or not the newly discovered realm is trustworthy by initiating communications with at least one trusted authentication server with respect to the first authentication server to ascertain whether or not there is an existing trust relationship between the at least one trusted authentication server and the newly discovered realm;
    responsive to an existing trust relationship between the at least one trusted authentication server and the newly discovered realm, the first authentication server determining that the newly discovered realm is trustworthy;
    responsive to a trust relationship not existing between the at least one trusted authentication server and the newly discovered realm, the first authentication server determining that the newly discovered realm is not yet trustworthy, with the first authentication server making one or more attempts to use a plurality of additional authentication tokens to validate information provided by the newly discovered realm before accepting any authentications from the newly discovered realm;
    responsive to receiving a plurality of correct authentication tokens from the newly discovered realm, the first authentication server then determining that the newly discovered realm is trustworthy;
    responsive to the first authentication server determining the newly discovered realm to be trustworthy, receiving a directory schema from the newly discovered realm and comparing the received directory schema with a known directory schema retrieved by the first authentication server to identify an intersection of the received directory schema and the known directory schema;
    the first authentication server using the intersection to identify a primary key, and to identify any unique information that is specific to either the first authentication server or the newly discovered realm.

2. The method of claim 1 wherein the incoming authentication request includes authentication data associated therewith.

3. The method of claim 2 wherein the authentication data includes an authentication token of the one or more authentication tokens from the newly discovered realm that the first authentication server cannot validate.

4. The method of claim 3 further comprising the first authentication server passing the incoming authentication request to the one or more additional servers of the newly discovered realm.

5. The method of claim 1 wherein the first authentication server searches for the one or more additional authentication servers using a service discovery method.

6. The method of claim 1 further comprising, subsequent to the first authentication server inspecting the incoming authentication request, adding the newly discovered realm to a discovery list.

7. A computer program product including a non-transitory storage medium readable by a processing circuit and storing instructions for execution by the processing circuit for facilitating a method for dynamically establishing a trust relationship between authentication servers, the method comprising:
    initiating by, a first authentication server, searching for the one or more additional authentication servers for the purpose of discovering one or more sources of authentication tokens, the searching comprising a processor node of the first authentication server initiating a communication exchange with at least one other processor node of the one or more additional authentication servers, and inspecting an incoming authentication request from the one or more additional authentication servers to determine if the incoming authentication request is carrying one or more authentication tokens from a newly discovered realm;
    responsive to the request carrying one or more authentication tokens from the newly discovered realm, determining, by the first authentication server, determining whether or not the newly discovered realm is trustworthy by initiating communications with at least one trusted authentication server with respect to the first authentication server to ascertain whether or not there is an existing trust relationship between the at least one trusted authentication server and the newly discovered realm;
    responsive to an existing trust relationship between the at least one trusted authentication server and the newly discovered realm, the first authentication server determining that the newly discovered realm is trustworthy;
    responsive to a trust relationship not existing between the at least one trusted authentication server and the newly discovered realm, the authentication server determining that the newly discovered realm is not yet trustworthy, with the first authentication server making one or more attempts to use a plurality of additional authentication tokens to validate information provided by the newly discovered realm before accepting any authentications from the newly discovered realm;

responsive to receiving a plurality of correct authentication tokens from the newly discovered realm, the authentication server the determining that the newly discovered realm is trustworthy;

responsive to the first authentication server determining the newly discovered realm to be trustworthy, receiving a directory schema from the newly discovered realm and comparing the received directory schema with a known directory schema retrieved by the first authentication server to identify an intersection of the received directory schema and the known directory schema;

the first authentication server using the intersection to identify a primary key, and to identify any unique information that is specific to either the first authentication server or the newly discovered realm.

8. The computer program product of claim 7 wherein the incoming authentication request includes authentication data associated therewith.

9. The computer program product of claim 8 wherein the authentication data includes an authentication token of the one or more authentication tokens from the newly discovered realm that the authentication server cannot validate.

10. The computer program product of claim 9 wherein the method further comprises the first authentication server passing the authentication request to the one or more additional servers of the newly discovered realm.

11. The computer program product of claim 7 wherein the first authentication server searches for the one or more additional authentication servers using a service discovery method.

12. The computer program product of claim 7 wherein, subsequent to the first authentication server inspecting the incoming authentication request, adding the newly discovered realm to a discovery list.

13. A system for dynamically establishing a trust relationship between authentication servers, comprising:

a first authentication server, including one or more processing devices, the first authentication server capable of searching for one or more additional authentication servers for the purpose of discovering one or more sources of authentication tokens, the searching comprising a processor node of the first authentication server initiating a communication exchange with at least one other processor node of the one or more additional authentication servers, and inspecting an incoming authentication request from the one or more additional authentication servers to determine if the incoming authentication request is carrying one or more authentication tokens from a newly discovered realm;

the first authentication server configured to determine, responsive the request is carrying one or more authentication tokens from the newly discovered realm, whether or not the newly discovered realm is trustworthy by initiating communications with at least one trusted authentication server with respect to the first authentication server to ascertain whether or not there is an existing trust relationship between the at least one trusted authentication server and the newly discovered realm;

the first authentication server configured to, responsive to an existing trust relationship between the at least one trusted authentication server and the newly discovered realm, determine that the newly discovered realm is trustworthy, and responsive to a trust relationship not existing between the at least one trusted authentication server and the newly discovered realm, determine that the newly discovered realm is not yet trustworthy, with the first authentication server configure to make one or more attempts to use a plurality of additional authentication tokens to validate information provided by the newly discovered realm before accepting any authentications from the newly discovered realm, and responsive to receiving a plurality of correct authentication tokens from the newly discovered realm, determine that the newly discovered realm is trustworthy;

the first authentication server configured to, responsive to determining the newly discovered realm to be trustworthy, receiving a directory schema from the newly discovered realm and comparing the received directory schema with a known directory schema retrieved by the first authentication server to identify an intersection of the received directory schema and the known directory schema; and the first authentication server configured to use the intersection to identify a primary key, and to identify any unique information that is specific to either the first authentication server or the newly discovered realm.

14. The system of claim 13 wherein the incoming authentication request includes authentication data associated therewith.

15. The system of claim 14 wherein the authentication data includes an authentication token of the one or more authentication tokens from the newly discovered realm that the authentication server cannot validate.

16. The system of claim 15 wherein the first authenticating server is configured to pass the authentication request to the one or more additional servers of the newly discovered realm.

17. The system of claim 13 wherein the first authentication server searches for the one or more additional authentication servers using a service discovery method.

18. The system of claim 13 wherein the first authentication server is configured to, subsequent to inspecting the incoming authentication request, add the newly discovered realm to a discovery list.

* * * * *